(12) United States Patent
Chang

(10) Patent No.: US 7,127,628 B2
(45) Date of Patent: Oct. 24, 2006

(54) METHOD FOR AUTOMATICALLY REGULATING AN OSCILLATOR

(75) Inventor: Chi-Tung Chang, Taipei County (TW)

(73) Assignee: Alcor Micro, Corp.(TW)

( * ) Notice: Subject to any disclaimer, the term of this patent is extended or adjusted under 35 U.S.C. 154(b) by 465 days.

(21) Appl. No.: 10/787,403

(22) Filed: Feb. 24, 2004

(65) Prior Publication Data

US 2005/0188234 A1  Aug. 25, 2005

(51) Int. Cl.
    *G06F 1/12* (2006.01)
(52) U.S. Cl. ............... 713/400; 713/322; 365/233
(58) Field of Classification Search .......... 713/400, 713/322; 365/233
    See application file for complete search history.

(56) References Cited

U.S. PATENT DOCUMENTS

| | | | |
|---|---|---|---|
| 6,297,705 B1 * | 10/2001 | Williams et al. | 331/44 |
| 6,407,641 B1 * | 6/2002 | Williams et al. | 331/1 A |
| 6,525,616 B1 * | 2/2003 | Williams et al. | 331/44 |
| 6,657,917 B1 * | 12/2003 | Lever | 365/233 |
| 6,762,635 B1 * | 7/2004 | Bruhnke et al. | 327/160 |
| 6,898,721 B1 * | 5/2005 | Schmidt | 713/322 |
| 2002/0065966 A1 * | 5/2002 | Brief | 710/100 |
| 2003/0227334 A1 * | 12/2003 | Chuang et al. | 331/74 |

* cited by examiner

*Primary Examiner*—Thomas Lee
*Assistant Examiner*—Vincent Tran

(57) ABSTRACT

A method for automatically regulating an oscillator is applicable to a low-speed USB interface connecting system and includes the steps of (a) providing a voltage-controlled oscillator in a USB interface for generating a controllable oscillating signal to a USB electronic device; (b) feeding back the controllable oscillating signal to a frequency comparing unit for comparing the controllable oscillating signal with a Keep Alive Strobe signal in the USB interface; (c) inputting an output signal of the frequency comparing unit to a frequency regulating unit for changing the frequency of the controllable oscillating signal according to a signal regulating voltage fed back from the frequency comparing unit; and (d) repeating (b) and (c) to synchronize the controllable oscillating signal with the Keep Alive Strobe signal in the USB interface; so that the USB interface connecting system and the USB electronic device may be quickly synchronized for data transmission at reduced cost.

3 Claims, 3 Drawing Sheets

METHOD FOR AUTOMATICALLY REGULATING AN OSCILLATOR

FIELD OF THE INVENTION

The present invention relates to a method for automatically regulating an oscillator, and more particularly to a method for automatically regulating an oscillator in which a Keep Alive Strobe signal in the Universal Serial Bus (USB) interface is utilized to regulate frequency, so that a USB connecting interface and a USB electronic device are synchronized within a very short time to enable data transmission.

BACKGROUND OF THE INVENTION

The Universal Serial Bus (USB) is one of the most noticeable products in the new generation of connecting interfaces at the end of year 1998, and has quickly become widely known in the market. The USB specification has actually long been established mainly by Intel in 1996.

However, most operating systems in the past did not support USB products because of the high cost when they were first introduced into the market, preventing the USB products from being widely accepted by users. Thanks to the introduction of iMAC, which uses USB interface, into the market and the built-in support provided by Windows 98, USB products eventually became the hottest products in the computer field.

Compared to the conventional expansion ports or slots USB largely simplifies connection to various kinds of expansion slots. It enables series connection of up to 127 devices to one computer (this is a theoretical value that may be reached depending on the cooperation between a USB hub and a signal cable; current experiments indicate that up to 111 USB devices may be series connected to one computer via the USB connector) and has the further advantages of enabling Hot Attach and Detach as well as plug-and-play. This means a user does not need to worry about the differences between various kinds of connecting ports nor does the user need to remove the external computer casing or wait for normal shutdown to install/unplug a peripheral. The user only needs to connect a new peripheral to an externally accessible, standard USB slot, execute the steps for installing a driver and the new peripheral can immediately operate normally. Theoretically speaking, any device adapted to transmit digital data may be designed to have a USB interface. Thus, a lot of devices, including loudspeakers, keyboards, mice, scanners, printers, digital cameras, etc., may be designed to connect to a computer via a USB interface. That is why the USB interface is so popular.

The USB is a standard connecting interface, which allows connection of an external apparatus to a computer without the need of re-allocating and re-planning the whole system, or the need of open the computer case to adjust the finger-tip controlled switch of the interface card. When a new peripheral is connected to a computer via the USB interface the computer will automatically identify the new peripheral and actuate an appropriate driver. The user does not need to change the computer settings. The starting point on the USB interface for connecting a USB device is referred to as the "host", which is a USB head for controller output. The USB head may be welded to a base plate or located at an external position. Currently, most base plates may support up to 4 USB plugs each. A regular high-speed USB cable must have aluminum foil and polyester shielding to prevent deterioration of signal during transmission via the cable. The cable internally includes four wires, two of which are positive and negative electrodes for electric power, and the other two are positive (D+) and negative (D−) electrodes for signal. It is important for the four wires to evenly fix inside the cable. The advantages of using a 4-wire cable are to reduce and simplify the plug connections and to enable easier control of the product hardware manufacturing costs.

When a personal computer (PC) mainframe issues a control signal all the devices and peripherals connected thereto receive the same signal via a root hub. However, after a comparison of the addresses allocated to these devices and peripherals, only one of them would respond to the signal correspondingly. This is somewhat similar to the network architecture. Therefore, it is necessary for a device or a peripheral not only to correctly receive the data sent from the mainframe but also to correctly issue a corresponding signal in response to the mainframe. For this reason a special encoding must be used for the differential data lines, D+ and D−, before sending the signal so as to solve the problems of signal delay and signal error associated with the USB cable. In this aspect the USB adopts a Non-Return to Zero Invert (NRZI) encoding method, which enables synchronous data access even without synchronous clock pulse signals. As a rule of the NRZI encoding data is not converted when a data bit is a "1"; data is converted when the data bit is a "0". Please refer to FIG. 3, that is an example explaining the NRZI encoding. A very severe problem exists during the encoding in this way. That is, when a plurality of the same "1" signals are repeatedly received the data are not converted for a long period of time and are thus accumulated, resulting in a "jamming" condition, which then causes serious mistakes in the sequence of reading data. Therefore, a bit-stuffing task must be executed during the NRZI encoding. FIGS. 4(a), 4(b), and 4(c) explain the process of NRZI decoding. Please refer to FIG. 4(a). When there are six consecutive "1" bits contained in an original serial data it is necessary to do the bit-stuffing task by stuffing a "0" bit after the sixth "1" bit, as shown in FIG. 4(b). And, in the process of NRZI encoding, data conversion is executed on these six consecutive "1" bits, as shown in FIG. 4(c).

Therefore, before data transmission at the sending end the tasks of bit stuffing and NRZI encoding must be executed. On the other hand, before data reception at the receiving end it is necessary to do NRZI decoding first and then proceed with the unBit-stuffing task.

The following are some of the features and advantages of the USB:

1. The USB interface unifies the connectors for various kinds of peripherals. All the communication interfaces, printer interfaces, display output, sound input/output devices, and storage devices use the same USB interface specification. The USB interface functions like a universal contact. A user needs only to insert a plug to complete all connections and setup (or whatever else).
2. The USB has the feature of plug-and-play and is able to automatically detect and allocate system resources. Moreover, the USB interface does not require system resources. That is, it is not necessary to arrange additional system resources in order to set up a USB device, such as interrupt request (IRQ), I/O address, and direct memory access (DMA).
3. The USB has the feature of Hot Attach & Detach. That is, a USB device may be plugged to or unplugged from the computer while the operating system is in a started and operating state. It is not necessary for the user to shut down the computer before connecting a USB device thereto.

4. The USB interface version 1.1 has a transmission speed of 12 Mbps that satisfies most user demands. Of course, the high-speed USB interface 2.0 provides an even better transmission rate.

5. One USB interface allows connection of up to 127 peripherals. Since the USB interface uses a 7-bit addressing field, it provides a total of $2^7=128$ usable addresses. After deduction of one address, that is preset by the USB host for a peripheral first connected to the computer, there are still 127 addresses available for use. Therefore, up to 127 USB devices may be connected to a computer via the USB interface.

In brief, the overall function of the USB is to simplify the connection between external peripherals and the computer mainframe. With the USB only a single transmission cable is used for series connection of various kinds of peripherals, such as the parallel port for a printer or the serial port for a modem, and the confusing problem of having a large mass of tangled cables and wires behind the mainframe is solved.

However, in using the USB system for data transmission, a clock pulse synchronizing system is required between the mainframe and the peripherals to synchronize their signals. In 1932 a concept was developed to use a phase-locked loop (PLL) as a frequency synthesizer. According to this concept, an input reference signal, extracted from a signal received from a remote transmitter, generates a limited oscillating signal, so that the frequency of the oscillating signal changes with the input reference signal. The following are different accuracies that must be met by different USB specifications for different data transmission rates:

For high-speed USB specification: 480 MHz+/−0.05%
For full-speed USB specification: 12 MHz+/−0.25%
For low-speed USB specification: 1.5 MHz+/−1.5%

Therefore, each device must be provided with its own clock pulse (frequency) generator, which must meet the above-mentioned accuracy ranges specified for the clock pulse (frequency) signal to enable compatibility of the device with the USB system.

Generally, a clock pulse (frequency) signal is generated via a circuit on a chip and has an accuracy range about +/−3%. A well-known way for increasing the signal accuracy is to use additional quartz units. However, the following disadvantages are found in the circuit design with additional quartz units:

1. Expensive:
   When an external quartz unit is used there must be one or two more connecting pins provided on the chip. Moreover, the quartz unit has a relatively high unit price that disadvantageously increases the cost of the USB device.
2. Bulky:
   In a chip card the quartz should have limited size, so that the thickness thereof does not exceed 800 micrometers. However, it is impossible to manufacture quartz to meet this predetermined specification.

U.S. Pat. No. 6,297,705 discloses the use of a digital controlled oscillator (DCO) to generate an oscillating signal where the frequency is compared using a counter and then coarsely and finely adjusted. The adjusted oscillating signal is then input to the DCO again. These procedures are repeated until the frequency of the oscillating signal is adjusted to synchronize with the USB electronic device. In this manner, the use of expensive quartz units can be avoided. Nevertheless, the disclosure of U.S. Pat. No. 6,297,705 has the following shortcomings:

1. Prolonged frequency adjusting time:
   The frequency is coarsely and finely adjusted using a whole packet signal instead of the Keep Alive Strobe signal initially generated by the USB system. This results in a prolonged frequency adjusting time.
2. High cost and power consumption:
   The design provided by U.S. Pat. No. 6,297,705 requires additional computation power, time consumption and higher costs. Basically, the design involves the use of a counter circuit that is comprised of a calibration block and a look-up table. When the frequency of oscillation is not corrected, the value of the signal will begin a start/stop count, which may be repeated over a longer portion of the packet in order to greater resolution in the correction term. This process requires computation power, time consumption and costs more.

Because of the above mentioned problems, the inventor developed a method of regulating the frequency using the Keep Alive Strobe signal generated by the USB interface system so that the USB interface connecting system and the USB electronic apparatus may be synchronized within a very short time to enable data transmission.

SUMMARY OF THE INVENTION

The primary object of the present invention is to provide a method for automatically regulating an oscillator by utilizing the Keep Alive Strobe signal in the USB interface system to regulate the input frequency so that the USB interface connecting system and the USB electronic device may be synchronized within a very short time period to enable data transmission.

Another object of the present invention is to provide a method for automatically regulating an oscillator that enables a reduced number of required components, and accordingly, reduced cost through using a low-speed USB interface connecting system.

To achieve the above and other objects the method for automatically regulating an oscillator according to the present invention is applicable to a low-speed USB interface connecting system and includes the steps of (a) providing a voltage-controlled oscillator in a USB interface for generating a controllable oscillating signal to a USB electronic device; (b) feeding back the controllable oscillating signal to a frequency comparing unit to compare the controllable, oscillating signal with a Keep Alive Strobe signal in the USB interface; (c) inputting an output signal of the frequency comparing unit to a frequency regulating unit for changing the frequency of the controllable oscillating signal according to a signal regulating voltage fed back from the frequency comparing unit; and (d) repeating (b) and (c) to synchronize the controllable oscillating signal with the Keep Alive Strobe signal in the USB interface so that the USB interface connecting system and the USB electronic device may be quickly synchronized for data transmission at reduced cost.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
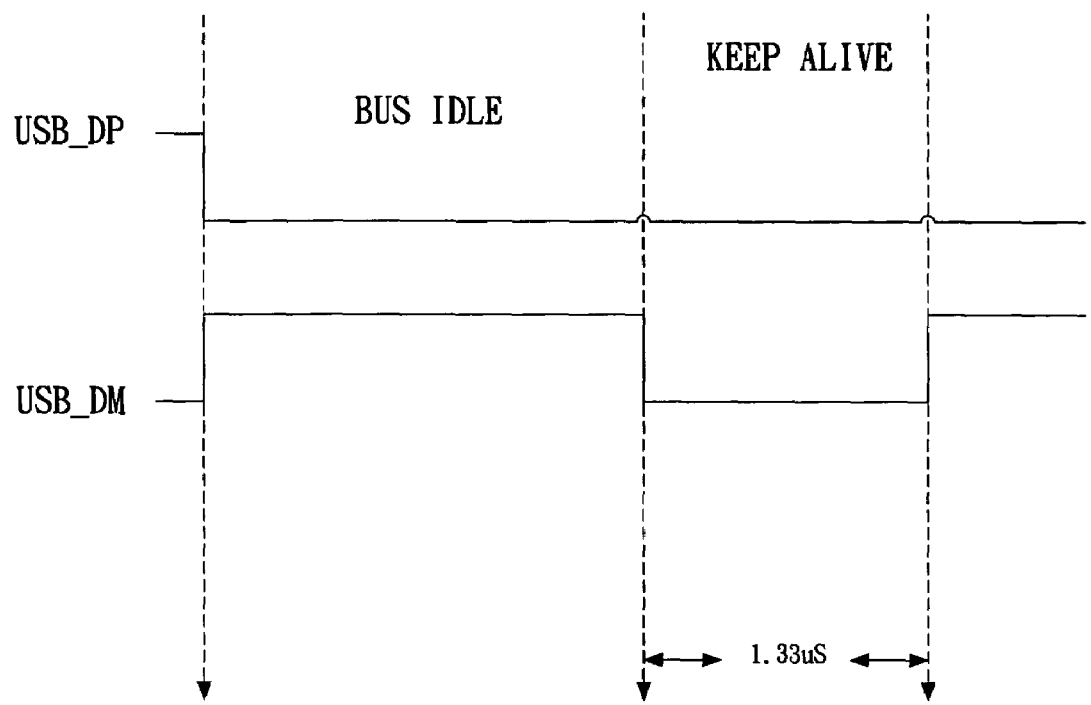
FIG. 1 is a clock pulse pattern for a USB interface connecting system.

Please refer to FIG. 1 that is a clock pulse pattern for a USB interface connecting system.

When a USB interface connecting system is in a connected state it will generate a Keep Alive Strobe signal having a width of 1.33 microsecond (μs) at an interval of one millisecond (ms). The system would automatically enter a non-connect state if there were not a response to the Keep Alive Strobe signal within 3 ms. A simple Phase-Locked Loop (PLL) may take advantage of this signal to continuously regulate synchronous signals of a USB.

Figure 2:
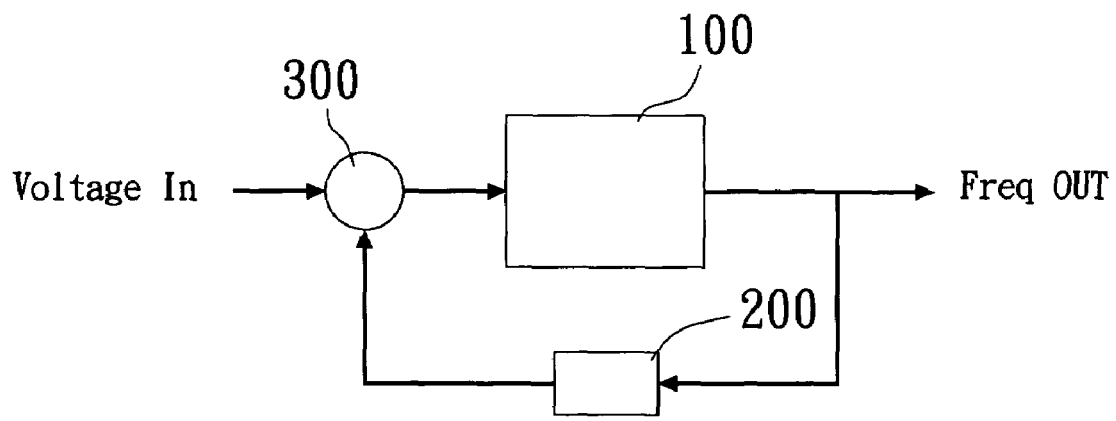
FIG. 2 is a flowchart showing the method for automatically regulating an oscillator according to the present invention.
Figure 3:
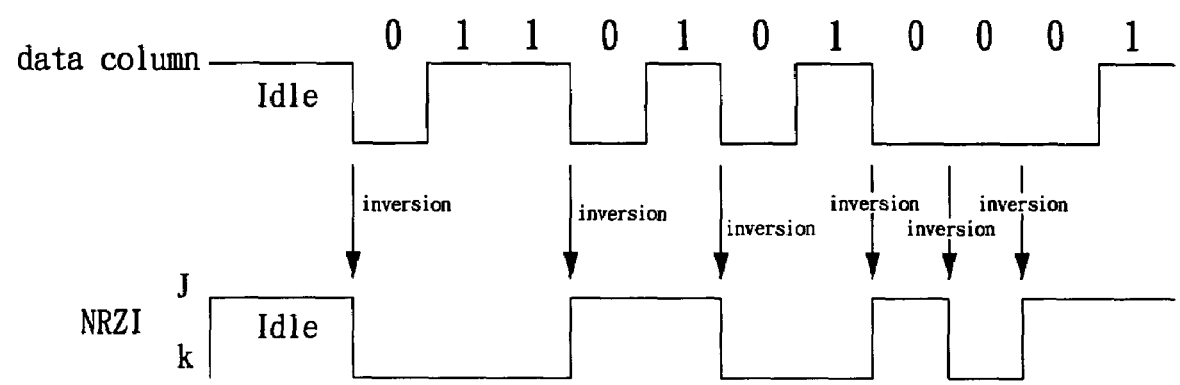
FIG. 3 is an example explaining the NRZI encoding.
Figure 4A:
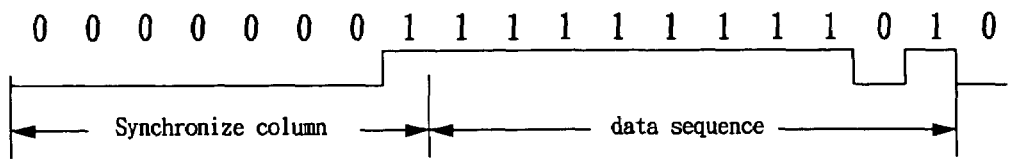
FIGS. 4(*a*), 4(*b*), and 4(*c*) explain the process of NRZI decoding.
Figure 4B:
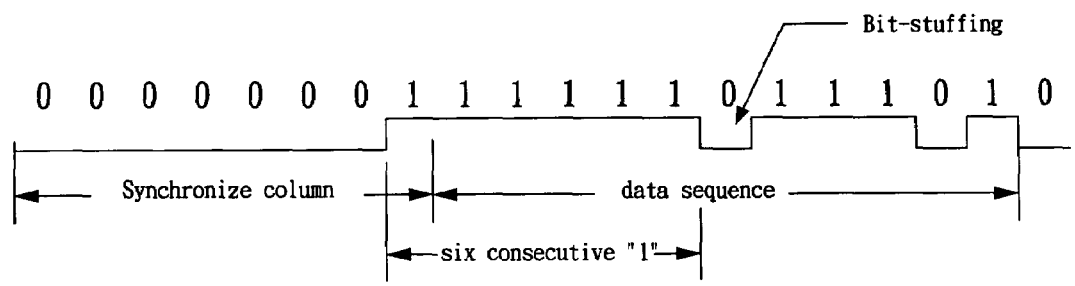
Figure 4C:
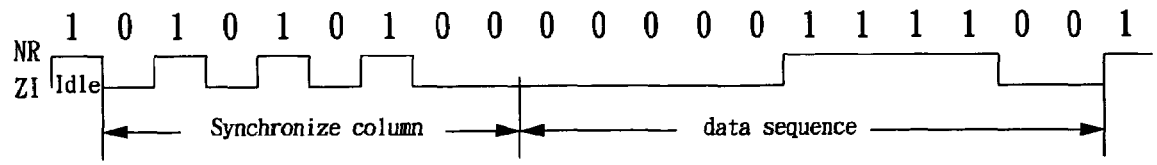

Please refer to FIG. 2 that is a flowchart of the method of the present invention for automatically regulating an oscillator.

As shown, the present invention is applicable to a low-speed USB interface connecting system and mainly includes the following steps:

(a) Providing a voltage-controlled oscillator 100 in a USB interface so that a controllable oscillating signal is generated by the voltage-controlled oscillator 100 to a USB electronic device;

(b) Feeding back the controllable oscillating signal to a frequency comparing unit 200, which is used to compare the controllable oscillating signal with the Keep Alive Strobe signal in the USB interface in order to find the difference between their frequencies;

(c) Inputting an output signal of the frequency comparing unit 200 to a frequency regulating unit 300, where the frequency of the controllable oscillating signal is changed according to a signal regulating voltage fed back from the frequency comparing unit 200; and (d) Repeating steps (b) and (c) to synchronize the controllable oscillating signal with the Keep Alive Strobe signal in the USB interface.

Wherein, the frequency comparing unit 200 and the frequency regulating unit 300 may be a micro integrated circuit. Through the comparison and regulation operations respectively conducted by the frequency comparing unit 200 and the frequency regulating unit 300 on the frequency of the oscillating signal output by the voltage-controlled oscillator 100, it is possible to achieve the function of automatically regulating the oscillator. It is noted that the present invention is most suitable for use with low-speed peripherals, that is, devices having a data transmission frequency below 1.5 MHz, such as a mouse, joystick, keyboard, or barcode scanner.

Since the present invention is particularly designed for use with a low-speed USB interface connecting system, it allows the clock pulse (frequency) accuracy to have an error range of +/−1.5%, which is much wider than the error ranges of +/−0.25% and +/−0.05% for a full-speed and a high-speed USB interface connecting system, respectively. This wide error range of +/−1.5% may be easily met using the PLL circuit with reference to the Keep Alive Strobe signal. Therefore, the present invention not only solves the problems of high cost and large volume in using the quartz units, but also shortens the time needed to adjust the frequency and reduces the high cost associated with the complicated structures that currently exist in the conventional skill. In brief, the present invention enables synchronization of the USB interface connecting system with USB electronic devices within very short time for data transmission at reduced cost.

What is claimed is:

1. A method for automatically regulating an oscillator applicable to a low-speed USB interface connecting system, comprising the steps of:

(a) providing a voltage-controlled oscillator in a USB interface so that a controllable oscillating signal is generated by said voltage-controlled oscillator to a USB electronic device;

(b) feeding back said controllable oscillating signal to a frequency comparing unit which is used to compare said controllable oscillating signal with a Keep Alive Strobe signal in said USB interface in order to find a difference between frequencies of said controllable oscillating signal and said Keep Alive Strobe signal;

(c) inputting an output signal of the frequency comparing unit to a frequency regulating unit where the frequency of said controllable oscillating signal is changed according to a signal regulating voltage fed back from said frequency comparing unit; and (d) repeating steps (b) and (c) to synchronize said controllable oscillating signal with said Keep Alive Strobe signal in said USB interface.

2. The method for automatically regulating an oscillator as claimed in claim 1 wherein said frequency comparing unit comprises a micro integrated circuit.

3. The method for automatically regulating an oscillator as claimed in claim 1 wherein said frequency regulating unit comprises a micro integrated circuit.

* * * * *